Patented Sept. 14, 1954

2,689,245

UNITED STATES PATENT OFFICE 2,689,245

ORGANIC NITROGEN BASE SILICATES AND METHOD OF PRODUCING SAME

Reynold C. Merrill, Philadelphia, Pa., assignor to Philadelphia Quartz Company, Philadelphia, Pa., a corporation of Pennsylvania No Drawing. Application September 28, 1949, Serial No. 118,473

18 Claims. (Cl. 260—247)

This invention relates to organic nitrogen base silicates and method of producing same; and it comprises a method of making nitrogen base silicates wherein a silica, which is advantageously in hydrated form or in the form of a silica sol or gel, is dissolved in an aqueous or organic solvent solution of a nitrogen base having a dissociation constant of at least about $10^{-5}$, followed by recovery of the resulting nitrogen base silicate usually in crystalline form. Certain important products within my invention can be defined by the general formula

$(NR^1R^2R^3R^4)_2O.X(SiO_2).Y(H_2O)$ wherein $R^1$, $R^2$, $R^3$ and $R^4$ represent substituent groups selected from a class consisting of hydrogen, alkyl, hydroxyalkyl, aminoalkyl, iminoalkyl, cycloalkyl, aralkyl, and aryl groups, at least one of said groups being selected from a class consisting of hydroxyalkyl, aminoalkyl, iminoalkyl, cycloalkyl, aralkyl and aryl groups, while X is a number varying from 0.5 being useful as wetting and emulsifying agents, as detergents, in coating compositions etc.; all as more fully hereinafter set forth and as claimed.

In recent years great strides have been made in studies upon organic silicon compounds and methods of making the same. Esters and ethers of silicon have been prepared in which the silicon atoms function in a manner very similar to that of carbon atoms in the usual organic compounds. Several entirely new series of organic-silicon compounds have been discovered. In these investigations the possibility of forming organic silicates, that is salts of silicic acid involving electrostatic bonds as contrasted with covalent bonds, has been neglected. Apparently it has been the impression in the art either that such compounds could not be formed or, if formed, they would have little or no utility.

I have found, however, that it is possible to form a new series of nitrogen base organic silicates by a relatively simple method involving dissolution of silica, usually in hydrated form or in the form of a silica sol or gel, in an aqueous or organic solvent solution of an organic nitrogen base, followed by recovery of the nitrogen base silicate. In this process it is essential that the nitrogen base have a dissociation constant of at least about $10^{-5}$ in order to produce a solution having the requisite pH of 9.5 or above to dissolve the silica and it is also essential that the nitrogen base be soluble in the solvent employed to the extent of at least about 0.1 per cent by weight. At pH values below about 9.5 the rate of solution of the silica is too slow and if a reaction takes place at all it appears to be a different type of reaction.

The nitrogen bases which are operative in the new process include the primary, secondary and tertiary alkyl amines and alkyl quaternary ammonium bases in which at least one of the alkyl groups is substituted by hydroxyl, amino or imino groups, and primary, secondary and tertiary aryl amines, quaternary ammonium bases, cycloalkyl amines and aralkyl amines. All the amines and quaternary ammonium bases of these widely different types are operative provided that they are soluble in the solvent employed to the amount of 0.1 per cent by weight and produce aqueous solutions having a pH of at least about 9.5. Phosphonium and sulfonium bases can be substituted for the ammonium bases to form the corresponding silicates.

The silica which is dissolved by the nitrogen base to form my compounds is preferably hydrated since the more the hydration the greater the rate of solution. Silica sols and gels are, of course, the most highly hydrated amorphous forms of silica. Next to these are the dehydrated amorphous silicas such as diatomaceous earth and dried gels. Following these come vitreous silica and finally the crystalline forms of silica, such as quartz, cristobalite, tridymite etc. which are very slowly soluble. The rate of solution also depends upon the strength of the nitrogen base, the particle size of the silica and the elemental structure of the silica such as the state of hydration and crystallinity. In order to dissolve a crystalline variety such as finely divided quartz at a reasonable rate it is necessary to use a strong base, a high temperature and preferably superatmospheric pressures.

If a silica sol is used it is possible to dissolve the nitrogen base directly in this sol, applying heat if necessary to bring about solution. The resulting solution can then be cooled and the desired nitrogen base silicate will usually precipitate therefrom in crystalline form and can be filtered off. The filtrate can be concentrated if necessary to recover additional silicate. When solid silicas are used it is best to dissolve these in concentrated solutions of the nitrogen bases, heating if necessary to speed up the rate of solution and followed by cooling to produce crystallization.

The following specific examples represent practical operating examples of the process of my invention making use of typical nitrogen bases and typical forms of silica. My invention, of course, is not limited to the specific procedures and materials used in these examples.

Example 1.—Phenyltrimethyl ammonium silicates

A solution of phenyltrimethyl ammonium hydroxide obtained from the Monsanto Chemical Company and a silica flour of quartz crystals passing a 300 mesh screen were allowed to react at 20° C. for 72 hours with continuous mixing. Only 0.077% of $SiO_2$ dissolved. The initial specific gravity was 1.0393 and after contact with the silica flour it was 1.0395. The test was repeated with 0.5 part micronized (finely pulverized) silica gel obtained from the American Hard Rubber Company dried at 250° C. and 200 parts of the alkali. After reaction the liquid had a specific gravity of 1.0711 and contained 5.7% $SiO_2$. Titration with HCl showed that the alkali had changed from 20.7% of the phenyltrimethyl ammonium hydroxide to 19.3%.

In another test 59.1 parts of the micronized silica gel containing about 10–15% water of hydration were revolved on a ball mill for 48 hours in 292.8 parts of a solution of the same phenyltrimethyl ammonium hydroxide which contained 25.7% of the alkali. The liquid was then centrifuged free of sediment and was found to contain 21.0% of the phenyltrimethyl ammonium hydroxide and 10.1% $SiO_2$ which gives a molecular ratio of 1.0 $R_2O$ to 2.8 $SiO_2$, wherein R represents the phenyltrimethyl ammonium residue. The solution was concentrated to 33.0% $R_2O$ and was cooled. The crystals which formed were filtered off through a coarse sintered glass Büchner funnel and the crystals were then dissolved in a little hot water, again cooled and refiltered. Recrystallization was repeated once more and then the crystals were dried in the vacuum desiccator. The yield was 31.7 parts of crystals having the analysis of 48.6% ROH, 27.8% $SiO_2$ and 23.5% $H_2O$ giving an approximate empirical formula of $R_2Si_3O_7 \cdot 8H_2O$. Analyses of similar preparations establish this trisilicate as being probably the 8-hydrate but other hydrates may exist.

When these crystals were allowed to stand exposed to the air they picked up water corresponding to a 12.6 hydrate and in this condition they had a density of 1.281 and a melting point between 91 and 93° C. whereas the melting point of the 8-hydrate was about 101–103° C.

The crystals when examined optically proved to be probably monoclinic but possibly triclinic and in the form of plates. The two sides project to a point with an angle of about 76°. Extinction is oblique to all crystallographic lines. Refractive indices ±.002 are alpha 1.492, beta 1.497 and gamma 1.530.

The silicate is insoluble in alcohol, acetone, ether, benzene and carbon tetrachloride. Electrometric titration shows that the equivalence point of the phenyl trimethylammonium silicate is about 5.7 pH.

In a further experiment 210 parts of a phenyltrimethyl ammonium hydroxide solution containing 18.56% $R_2O$ was added to 150.3 parts of a solution containing 23.68% $R_2O$ and 10.37% $SiO_2$, thus giving a ratio in the solution of 1$R_2O$ to 1.006$SiO_2$ with 20.7% $R_2O$ and 4.3% $SiO_2$.

Crystals separated and these were twice recrystallized from water and after drying in a desiccator 12.5 parts were recovered. Direct titration to the methyl red end point showed that the crystals contained 47.4% $(C_6H_5(CH_3)_3N)_2O$ and the silica analysis gave 19.3% $SiO_2$ corresponding to the formula $$1.00R_2O : 1.96SiO_2 : 11.3H_2O$$

The electrometric titration curve of this compound establishes this product as the salt of a monobasic acid.

Another batch of crystals was obtained by concentrating a 2.27 N solution of the base containing 13.5% $SiO_2$. After two recrystallizations from water and drying in a desiccator, the product contained 53.2% $(C_6H_5(CH_3)_3N)_2O$ by direct titration to the methyl orange end point, 22.4% $SiO_2$ and 24.4% $H_2O$. The electrometric titration curve shows clearly that these crystals are a salt of a dibasic acid with the first equivalence point at around pH 8.3 and the second around pH 4.5. More than an equivalent of HCl is required to reach the methyl orange end point pH 3.8. Methyl red which changes color around pH 4.8 was found to be a more suitable indicator.

The second end point showed that 3.63 milliequivalents of HCl were required to neutralize 1.00 gram of the phenyl trimethyl ammonium silicate corresponding to 52.4%

$$(C_6H_5(CH_3)_3N)_2O$$

This corresponds to 1.00 $(C_6H_5(CH_3)_3N)_2O$, 2$SiO_2$ and 7.71 $H_2O$.

Still another crystalline product was prepared to demonstrate the existence of a phenyl trimethyl ammonium trisilicate. A solution of silica in phenyl trimethyl ammonium hydroxide was concentrated until it contained 29.4% $R_2O$ and 12.8% $SiO_2$. On cooling the solution yielded crystals which were filtered off, washed and recrystallized twice from water followed by drying in a vacuum. These crystals contained 52.3% $R_2O$ and 28.8% $SiO_2$ corresponding to the formula $1.00(C_6H_5(CH_3)_3N)_2O, 2.65SiO_2, 5.80H_2O$. A third recrystallization followed by drying gave a product containing 50.1% $H_2O$ and 28.8% $SiO_2$ corresponding to $1.00(C_6H_5(CH_3)_3N)_2O, 2.77SiO_2, 6.75H_2O$. The thrice-recrystallized product melted at 101–103° C. This product was evidently a mixture of the di- and tri-silicate.

The di- and trisilicates are difficult to separate from each other by recrystallization. Three crystallizations are not sufficient to give a pure product.

An attempt was made to determine more accurately the composition of these crystalline products by means of The Schreinemaker wet residue method. These tests showed that the crystalline products were mixtures of di- and trisilicates, but predominantly the latter. From these tests it was also possible to estimate approximately the solubility at 0° of silica in phenyltrimethyl ammonium hydroxide solutions of varying concentrations. The solubility of silica in the base phenyltrimethyl ammonium hydroxide decreases from about 15% $SiO_2$ in a solution of the base equivalent to 23% $R_2O$, to 9% $SiO_2$ at 28% $R_2O$, and about 2.5% $SiO_2$ at 40% $R_2O$.

These silicates can also be prepared using anhydrous organic solvents capable of dissolving the amine bases, such as butanol, for example. This is shown from a test in which 0.2 mol of anhydrous micronized silica gel was rotated with 0.2 mol of 1.8 N phenyl trimethyl ammonium butoxide dissolved in anhydrous butanol, for forty-eight hours at room temperature. 1.89% $SiO_2$ was obtained in the filtrate. Upon chilling a crystalline phenyl trimethyl ammonium silicate was obtained from this filtration.

All three of the silicates produced as described above were found to be excellent wetting, emulsifying and detergent agents. In one series of tests, for example, the suspending power of the acid metasilicate, phenyl trimethyl ammonium silicate, was tested by filling three tubes to the 200 ml. mark with distilled water. The first tube was used as a blank while to the second and third there were added 0.1% and 0.001% by weight of the silicate, respectively. To each of the three tubes was then added 0.2 g. of Ilmenite Black and the tubes were shaken. After standing four hours samples were withdrawn and tested for turbidity with a Klett-Summerson colorimeter. It was found that in the blank 4.4 mg. Ilmenite per 100 ml. were still in suspension while the other two tubes contained 48.6 and 99.7 mg. per 100 ml. respectively in suspension, thus demonstrating the suspending action of the silicate.

*Example 2.—Tetraethanol ammonium silicates*

200 parts of tetraethanol ammonium hydroxide solution in the form of an aqueous methanolic solution obtained from Carbide and Carbon Chemicals Company and containing 50.79% of the organic hydroxide was allowed to react with 28.8 parts of micronized silica gel dried at 250° C. The specific gravity of the suspension before reaction was 1.1620 and after reaction for 72 hours at 20° C. was 1.2508. Centrifuged liquor contained 12.4% $SiO_2$ and 41.6% of the hydroxide as determined by titration. This corresponds to the formation of 54.2% of tetraethanol ammonium disilicate in the solution. The crystals which separated on cooling were washed in 1 vol. water, 3 vol. methyl alcohol and dried under vacuum. Analysis gave a ratio of $$1.0((HOC_2H_4)_4N)_2O:2.7SiO_2$$

An amorphous impurity was present which gave a brown color to the mixture.

When an excess of micronized silica gel was used a clear centrifugate with a specific gravity of 1.4177 was obtained. This contained 16.18% of $SiO_2$ and 41.13% of the base.

A similar reaction in which pulverized silica, 300 mesh, was used instead of the hydrated silica gel gave a mixture with a specific gravity of 1.1633 and containing only .11% $SiO_2$.

In another reaction 250 parts of tetraethanol ammonium hydroxide containing 47.7% ROH was revolved on the ball mill for 48 hours. 43.5 parts of micronized silica gel were dissolved completely. The solution thus contained 28.82% of the $R_2O$ and 13.44% of $SiO_2$. Crystals separated without further concentration and after double recrystallization in $H_2O$ and drying in vacuo contained 92.4% ROH and 30.7% $SiO_2$ which is a molecular ratio of 1.0 to 2.21 $SiO_2$. It was assumed that some exchange between the ethyl and methyl groups took place in the original solution.

Electrometric titrations indicate that the samples were salts of a monobasic acid although they evidently contained some impurity. The equivalence point appears to be about pH 5.7.

When examined optically the light brown crystals obtained above were found to be either monoclinic or triclinic and had the form of thin rhombic plates having either a strong cleavage parallel to the flat side of the plate or else a very marked tabular growth. The plates show the emergence of an optic axis but not a bi-sectrix. Samples had refractive indices of alpha=1.501, beta=1.515 and gamma=1.524. The crystals had a density of 1.578 and a softening point of 80–82° C. This did not appear to be a true melting point.

The silicate is insoluble in alcohol, acetone, ether, benzene or carbon tetrachloride. Solutions were prepared containing as much as 21% $SiO_2$.

The above data demonstrate the existence of a crystalline tetraethanol ammonium silicate, probably the acid metasilicate or disilicate and perhaps also a trisilicate. The indications are that the tetraethanol ammonium hydroxide employed contained extraneous impurities.

*Example 3.—Guanidine silicates*

A solution of guanidine containing 8.9% guanidine as $C(NH_2)_2NH$ and having a specific gravity of 1.0561 was prepared by metathesis with lime and guanidine carbonate. 200 parts of this solution was allowed to react on the ball mill for 72 hours with 10 parts of micronized dried silica gel. The centrifuged liquor had a specific gravity of 1.0841 and contained 8.71% guanidine and 5.24% $SiO_2$, corresponding to 15.72% of a guanidine silicate having the formula $$(C(NH_2)_2NH)_2SiO_3$$

After long standing the liquid phase separated fine feathery crystals.

These were isolated, washed 12 times with water at room temperature. The yield was 11.8 parts of dry crystals. On drying overnight at 105° C., these latter crystals lost 10.5% of their weight and lost an additional 35.0% on ignition. They contained 54.5% $SiO_2$. If it is assumed that the loss at 105° gives the amount of water, and that the subsequent loss on ignition represents the guanidine, these figures give a molecular composition of $1.00H_2N—C(=NH)—NH_2$, $1.53SiO_2$, $0.98H_2O$.

In another test 250 parts of a solution containing 16.3% guanidine was allowed to revolve on the ball mill for 48 hours with 83.1 parts of micronized silica gel. This gave a centrifuged liquor containing 13.06% of guanidine and 2.34% of $SiO_2$. The solution was concentrated to 5% $SiO_2$ and allowed to stand for about two months. Fine white crystals which formed on standing were filtered through a sintered glass filter, washed with water and dried under vacuum. The loss in weight of the crystals dried at 105° C. was 4.9% and on ignition was 37.34%. The loss of the remaining residues by HF treatment represented 57.72% $SiO_2$ based on the original total. This indicates a crystal having ratios of 1.0 guanidine, $1.52SiO_2$, $0.43H_2O$.

However a more accurate analysis was made by dissolving the material dried to a constant weight at 105° C. in 50 ml. of water by boiling for fifteen minutes. The solution was filtered and washed and the filtrate was titrated with N/5 HCl to determine $R_2O$ and $SiO_2$ was determined gravimetrically. The filtered residue was dried and weighed. In this case the loss at 105° was 7.12%. On the dry basis, $R_2O$ was 20.2%, $SiO_2$ 16.8% and $H_2O$ 1.2%, giving ratios of $1R_2O:1.89SiO_2:0.46H_2O$. The other dried samples gave approximately the same analysis.

In a similar example a composition of $$1.00H_2N—C(NH)—NH_2, 1.54SiO_2, 12H_2O$$

was obtained indicating that hydrates may be formed. However, electrometric titration indicated that these precipitates were impure salts of monobasic acids, i. e. acid metasilicates or orthosilicates of the same silica-alkali ratio.

The density of the guanidine silicate crystals was found to be 1.672 and they decomposed without melting when ignited. This silicate was not soluble in methyl or ethyl alcohol, water, ether, acetone, benzene or carbon tetrachloride.

It was soluble in 10% sodium hydroxide and in HF. The highest concentration obtained by dissolving and concentrating in $H_2O$ was 4.7% $SiO_2$. On recrystallization, compositions of 1ROH; 1.03–1.06$SiO_2$; 0.13–0.30$H_2O$ were obtained.

When examined optically the crystals were found to be orthorhombic minute elongated plates with negative elongation. The indices are 1.496, 1.515 and 1.520.

Guanidine is a strong monoacid base whose cation can be regarded as $C(NH_2)_3^+$. The above data indicate that the product obtained is an acid metasilicate $C(NH_2)_3HSiO_3$, which probably exists as an anhydrous salt. Another possibility is that the guanidine silicate is a high polymer containing guanidine which might act as a polyfunctional compound and copolymerize with silicic acid. The fact that the guanidine silicate product is insoluble in water and the common organic solvents is in agreement with the idea of its being a high polymer. A simple monomeric guanidine silicate would be expected to be soluble in water and probably also in methyl and ethyl alcohols. Its solubility in hot 10% sodium hydroxide and hydrofluoric acid might be explained as due to degradation of the high polymer chain.

*Example 4.—Morpholine silicate*

89.2 parts of morpholine containing 97.7% $(CH_2)_4ONH$ was revolved on a ball mill for 48 hours with 12.1 parts of micronized silica gel and centrifuged. The clear liquor had a specific gravity of 0.999 compared to the original 1.000 and contained 99.05% of morpholine and 0.13% of $SiO_2$. This would correspond to 0.54% of a compound having the formula $$((CH_2)_4ONH_2)_2SiO_3$$

*Example 5.—Dicyclohexylamine silicate*

186.4 parts of a solution containing 97.25% of dicyclohexylamine, $C_{12}H_{22}NH$, was rotated on the ball mill for 72 hours with 12 parts of micronized silica gel and the residue was centrifuged. The clear liquid had a specific gravity of 0.9192 compared to the original of 0.9156. 0.21% of $SiO_2$ was dissolved corresponding to 1.46% of a compound having the formula $(C_{12}H_{22}N)_2HSiO_3$. The product was found to be soluble in ether and insoluble in water and to decompose on heating to 255° C. to yield $SiO_2$ which deposits as a coherent film on the walls of the container. Attempts to titrate the alkali in the resultant solution failed because of immediate coagulation. The solution free from silica was readily titrated.

*Example 6.—Benzyl trimethyl ammonium silicate*

250 parts of a solution containing 39.80% of benzyl trimethyl ammonium hydroxide was allowed to revolve on a ball mill for 48 hours with 71.47 parts of micronized silica gel. The centrifugate contained 33.89% ROH, 5.74% $SiO_2$ and was concentrated to 45.02% ROH. When cooled, slightly yellow crystals were formed.

Another sample of crystals was made by concentrating a solution of silica in 2.38 N benzyl trimethyl ammonium hydroxide similarly prepared until the final concentration was 2.84 N base and 7.66% $SiO_2$. Crystals formed on cooling this solution and these were twice recrystallized from water and dried in a vacuum desiccator. A yield of 31.9 parts of benzyl trimethyl ammonium silicate was obtained.

When examined optically these yellowish crystals were found to be either monoclinic or triclinic. Extinction was always oblique and crystals were in the form of rhombic plates, with refractive indices of 1.490, 1.496 and 1.529.

Wet residue determinations confirmed the existence of benzyl trimethyl ammonium disilicate and indicate that a 13 or 14 hydrate rather than the 8 hydrate is formed. These determinations also indicated the existence of benzyl trimethyl ammonium trisilicate. The crystals had a density of 1.242, a softening point of 92–93° C. and a melting point of 99–100° C.

Electrometric titration shows that this compound is monobasic with dibasic impurities having equivalence points at pH 7.5 and pH 4.5.

Another benzyl trimethyl ammonium silicate obtained from a less concentrated solution and recrystallized twice was also redissolved and titrated electrometrically. The curve obtained was almost identical to that obtained previously, both showing that these benzyl trimethyl ammonium silicate samples were salts of a monobasic acid although both contained salts of a di- or polybasic acid as an impurity. The amount of HCl required to reach pH 4.5 with the latter sample was 3.21 milliequivalents per gram corresponding to 51.1% $(C_6H_5CH_2(CH_3)_3N)_2O$. This sample contained 19.0% $SiO_2$ so that its composition corresponded to 1.00$R_2O$, 1.96$SiO_2$, 10.2$H_2O$. The first sample required 3.433 milliequivalents of HCl per gram to reach pH 4.5 corresponding to 55.0% $R_2O$. Since it contained 19.2% $SiO_2$ its composition corresponded to 1.00$R_2O$, 1.82$SiO_2$, 7.87$H_2O$. These data establish the existence of benzyl trimethyl ammonium acid metasilicate hydrates. The compound is soluble in ethyl and methyl alcohol as well as water but is insoluble in ether, acetone, benzene and $CCl_4$.

*Example 7.—Cyclohexylamine silicate*

99.9 parts of cyclohexylamine $C_6H_{11}NH_2$ and 12.1 parts of micronized silica gel were allowed to react at 20° C. for 24 hours with continuous stirring. The clear centrifugate then had a specific gravity of 0.8737 compared to the original 0.8697 and contained 98.3% of the cyclohexylamine and 0.32% of $SiO_2$, corresponding to 1.29% of a product having the formula $(C_6H_{11}NH_3)_2SiO_3$. This product caused the solution to foam readily.

*Example 8.—Dibenzyl dimethyl ammonium silicate*

Dibenzyl dimethyl ammonium hydroxide was disolved in water to make a solution 1.6 normal. A micronized silica gel was added in quantity sufficient to produce a ratio of solid gel to mol ROH of 1.0. This mixture was rotated on the ball mill for a period of 48 hours. The resulting solution was analyzed for $SiO_2$ and it was found that it contained 1.9% $SiO_2$, showing the formation of a dibenzyl dimethyl ammonium silicate.

*Example 9.—Various amine silicates*

A series of tests were made in which weighed quantities of a micronized silica gel containing 9.3% $H_2O$ and 90.2% $SiO_2$ were added to a series of solutions of different amines and the mixtures were placed on a ball mill for 48 hours at room temperature after which the resulting solutions were analyzed for $SiO_2$ after separation from the residue by centrifuging. Some of these results were then compared with those obtained by refluxing aqueous silica gel-amine mixtures at their boiling points for a period of 3 hours. The quantity of water present in the aqueous silica gel-amine mixtures amounted to at least 0.7 g. or 9.3% based on the SiO₂ present. The results obtained in these tests are collected in the following table:

| Amine | Weight of Amine, g. | Weight of Silica Gel, g. | Percent SiO₂ in Centrifugate | Percent SiO₂ in Reflux |
|---|---|---|---|---|
| Ethylene diamine | 144.9 | 49.5 | 0.10 | |
| Diethylene diamine | 104.9 | 53.6 | 0.14 | |
| Do | 103 | 7.5 | | 0.24 (207° C.) |
| Triethylene tetramine | 120.6 | 43.4 | 0.02 | |
| Tetraethylene pentamine | 146.2 | 46.4 | 4.82 | |
| Monoethanol amine | 61 | 7.5 | 0.08 | 0.09 (170° C.) |
| Diethanol amine | 105 | 7.5 | 1.32 | 1.53 (270° C.) |
| Triethanol amine | 149 | 7.5 | 1.04 | 1.53 (277° C.) |
| Cyclohexyl amine | 99 | 7.5 | | 0.085 (134° C.) |
| Morpholine | 87 | 7.5 | | 0.106 (129° C.) |

The temperatures indicated in the last column of the table are the reflux temperatures. Crystalline silicates could be obtained from all of the above solutions by concentrating and/or cooling.

The amine silicates of this invention are useful in a large number of industrial applications. The quaternary ammonium silicates, for example, are useful as germicides, fungicides and insecticidal dusts and for other uses where a controlled rate of solution or solubility is desired. As mentioned previously all are useful as wetting, emulsifying and detergent agents and all are useful in coating compositions, for example in the production of organic silicate films or siliceous films upon drying and heating. Some are useful for dehairing in the field of leather and hide dressing and others as textile assistants, ore flotation agents, as components of printing inks and dye baths, as catalysts etc. The compounds have unique and advantageous properties since they are not esters or ethers like the ordinary silicones, siloxanes, silanols, silicols, siliconates, etc. They are actualy salts having anions and cations which are both active. In other words my products have electrostatic bonds and not the covalent bonds of these prior products. In use, solutions of these silicates can be prepared in which the ratio of cation to silicate anion can be changed at will thus enabling the compounds to meet the special requirements of various particular uses. Crystalline compounds can usually be obtained having compositions varying from the acid metasilicate to the trisilicate. In some cases the crystal products have a definite chemical composition and a definite molecular ratio whereas in other cases it appears that mixed crystals are formed. Many other uses for these new products will undoubtedly be evident to those skilled in this art.

While I have disclosed what I consider to be the best embodiments of my process it is evident, of course, that various modifications can be made in the specific procedures which have been described without departing from the purview of this invention. It is believed to be evident that in the dissolving step of my process any finely divided silica can be used which is soluble in alkaline solutions—the more finely divided and the more highly hydrated the better. Silica sols are, as mentioned previously, the most highly hydrated and the most highly soluble form of silica available and these can be advantageously used as a source of the silica. Any of the conventional methods of preparing such sols can be employed such as the dialysis of neutralized alkali metal silicate solutions or the passage of such solutions in contact with a base exchange compound operating in the hydrogen cycle. For the preparation of pure compounds it is important that the source of silica employed be free from extraneous alkali or at least that the solution from which the crystals are obtained be free from extraneous alkali since such alkali invariably appears in the amine silicate as an impurity. While the specific examples show the preparation of metasilicates, disilicates and trisilicates, it is also possible to prepare sesquisilicates and tetrasilicates by employing the proper molecular ratio of the reactants in my process. It is possible to employ any of the conventional crystallizing techniques to produce crystals of the amine silicate. If saturated solutions are produced in the initial steps of the process it is usually only necessary to cool these solutions to produce crystals. Otherwise it may be necessary to concentrate the solutions. It is also possible to add a precipitating agent, such as an organic water-miscible solvent (alcohol or acetone, for example) to cause crystallization. If desired and as shown by the examples, organic solutions of the organic nitrogen bases can be employed to react with the silica in lieu of aqueous solutions. Suitable organic solvents are methyl, ethyl and butyl alcohols and acetone, for example. Since the organic nitrogen base silicates are usually not as soluble in these organic solvents as in water and since they are more expensive, it is usually preferred to use water as a solvent.

Several other methods are available for producing solutions of my amine silicates from which the crystalline silicates can be obtained. One of these is a base exchange method in which a sodium silicate solution is passed in contact with a synthetic resin base exchange compound which has been previously contacted with an organic nitrogen base to form an organic ammonium ion resin. In the resulting base exchange the sodium ion in the solution is replaced by the organic ammonium ion thus forming a solution of the corresponding amine silicate.

Other modifications of my invention which fall within the scope of the following claims will be immediately evident to those skilled in the art.

What I claim is:

1. In the manufacture of organic nitrogen base silicates, the process which comprises reacting a silica which is soluble in aqueous alkalis with a substantially saturated solution of a free organic nitrogen base having a dissociation constant of at least $10^{-5}$, said solution having a pH of at least about 9.5 and containing dissolved therein at least about 0.1% by weight of said nitrogen base, and crystallizing from the resulting alkaline-reacting solution an organic nitrogen base silicate.

2. The process of claim 1 wherein a silica sol is used as the source of silica.

3. The process of claim 1 wherein a finely-divided silica gel is used as the source of silica.

4. The process of claim 1 wherein crystallization is produced by producing a saturated solution of the silicate followed by cooling to cause crystallization.

5. The process of claim 1 wherein crystallization is produced by adding to the silicate solution a water-miscible organic solvent serving as a precipitating agent.

6. The process of claim 1 wherein the organic nitrogen base is tetraethanol ammonium hydroxide.

7. The process of claim 1 wherein the organic nitrogen base is phenyltrimethyl ammonium hydroxide.

8. The process of claim 1 wherein the organic nitrogen base is guanidine.

9. The process of claim 1 wherein the nitrogen base is morpholine.

10. In the manufacture of organic nitrogen base silicates the process which comprises reacting a silica which is soluble in aqueous alkalis with a solution containing dissolved therein at least about 0.1% of a free organic nitrogen base having a dissociation constant of at least about $10^{-5}$ and having the general formula $$NR^1R^2R^3R^4OH$$

wherein $R^1$, $R^2$, $R^3$ and $R^4$ are substituent groups selected from a class consisting of hydrogen, alkyl, hydroxyalkyl, aminoalkyl, iminoalkyl, cycloalkyl, aralkyl and aryl groups, at least one of said groups being selected from a class consisting of hydroxyalkyl, aminoalkyl, iminoalkyl, cycloalkyl, aralkyl and aryl groups, the solution of said nitrogen base having a pH of at least about 9.5, and recovering the corresponding organic nitrogen base silicate from the resulting alkaline-reacting solution thereof.

11. The process of claim 10 wherein a silica sol is used as the source of silica.

12. The process of claim 10 wherein a finely-divided silica gel is used as the source of silica.

13. The process of claim 10 wherein the organic nitrogen base silicate is crystallized from its solution.

14. Organic nitrogen base silicates having the general formula $$(NR^1R^2R^3R^4)_2O.X(SiO_2).Y(H_2O)$$

wherein $R^1$, $R^2$, $R^3$ and $R^4$ are substituent groups selected from a class consisting of hydrogen, alkyl, hydroxyalkyl, aminoalkyl, iminoalkyl, cycloalkyl, aralkyl and aryl groups, at least one of said groups being selected from a class consisting of hydroxyalkyl, aminoalkyl, iminoalkyl, cycloalkyl, aralkyl and aryl groups, while X is a number varying from 0.5 to 4 and Y is a number varying from about 0 to 15; said products being capable of existing in crystalline form and having wetting and emulsifying properties; the free nitrogen bases of said silicates having dissociation constants of at least $10^{-5}$ and forming aqueous solutions having pH values of at least about 9.5.

15. As a new product a crystalline tetraethanol ammonium silicate.

16. As a new product a crystalline phenyltrimethyl ammonium silicate.

17. As a new product a crystalline guanidine silicate.

18. As a new product a crystalline morpholine silicate.

References Cited in the file of this patent

UNITED STATES PATENTS

| Number | Name | Date |
|---|---|---|
| 2,348,072 | Kanhofer | May 2, 1944 |
| 2,392,767 | Robinson | Jan. 8, 1946 |
| 2,408,654 | Kirk | Oct. 1, 1946 |
| 2,415,017 | MacKenzie | Jan. 28, 1947 |

OTHER REFERENCES

Steigmann: "Journal So. Chem. Ind." (London), vol. 66 (1947), page 355.

Jordan: "J. Phys. and Colloid. Chem.," vol. 53 (February 1949), pp. 294–305.